United States Patent [19]

Van Royen et al.

[11] Patent Number: 4,944,929

[45] Date of Patent: Jul. 31, 1990

[54] PROCESS FOR THE REMOVAL OF NITROGEN OXIDE FROM FLUE GASES

[75] Inventors: Luc Van Royen, Stabroek; Roland Putseys, Heide-Kalmthout; Willy Van Herck, Brasschaat; Domien Sluyts, Stabroek; Robert Pype, Ekeren, all of; Karl Brändle, Bergisch Gladbach, Fed. Rep. of Germany

[73] Assignee: Bayer Aktiengesellschaft, Leverkusen, Fed. Rep. of Germany

[21] Appl. No.: 367,001

[22] Filed: Jun. 16, 1989

[30] Foreign Application Priority Data

Jun. 28, 1988 [DE] Fed. Rep. of Germany ....... 3821744

[51] Int. Cl.$^5$ .................. C01B 21/00; C01B 21/20
[52] U.S. Cl. ................... 423/235; 423/351; 423/385
[58] Field of Search .............. 423/235, 385, 351

[56] References Cited

U.S. PATENT DOCUMENTS

| 4,400,362 | 8/1983 | Lerner | 423/235 |
| 4,663,135 | 5/1987 | Miller | 423/235 |

FOREIGN PATENT DOCUMENTS

| 0234248 | 2/1987 | European Pat. Off. . |
| 3640119 | 7/1987 | Fed. Rep. of Germany . |
| 1221600 | 1/1960 | France . |

OTHER PUBLICATIONS

Chemical abstracts-Dr. 47462C, Feb. 1973, p. 254, Ohio.

*Primary Examiner*—Gregory A. Heller

[57] ABSTRACT

Nitrogen oxide is removed from flue gases of combustion plants or reaction gases by a process wherein the nitrogen oxide contained in the stream of gas is converted into a stochiometric composition of $N_2O_3$ and removed from the gas stream.

11 Claims, No Drawings

PROCESS FOR THE REMOVAL OF NITROGEN OXIDE FROM FLUE GASES

This invention relates to a process for the removal of nitrogen oxides from flue gases of combustion plants or reaction gases.

BACKGROUND OF THE INVENTION

It is known to remove the nitrogen oxides from exhaust gases by means of catalysts suitable for this purpose together with a supply of ammonia. The exhaust gas containing nitrogen oxide is converted into nitrogen in the process so that the NO originally present is converted into an inert substance.

EP 0 174 907 A2 discloses a process in which both nitrogen oxide and sulphur dioxide can be removed from exhaust gases. In this process, a solution of nitric acid is added to the exhaust gas in a so called denitrating zone. This procedure adjusts the $NO/NO_2$ ratio to such a value that the dinitrogen trioxide formed can easily be concentrated as nitrosyl sulphuric acid in several successive sulphuric acid absorption stages. From the nitrosyl sulfuric acid a dilute nitric acid and a nitrous-free sulphuric acid are prepared in a separate step of the process at an elevated temperature and with the addition of air, and this nitric acid and sulphuric acid are used again in the denitrating zone and the sulphuric acid absorption stages. This process requires about 7 to 8 absorption towers for concentrating the dinitrogen trioxide as nitrosyl sulphuric acid and therefore involves considerable technical expenditure.

DD 212 495 A1 describes a process for the removal of nitrogen oxides from exhaust gases by successive washing with water and with dilute nitric acid combined with absorption in concentrated sulphuric acid. This process in in principle similar to the one described above but is carried out by a modified procedure.

Although substantial removal of nitrogen oxides from exhaust gases can be achieved by the processes described above, it is not possible to evaluate the nitrogen oxide content of the exhaust gas directly without intermediate stages of working up for the recovery of trivalent, tetravalent or pentavalent nitrogen oxides.

It is therefore an object of the present invention to provide a process which does not have the disadvantages of the processes described above.

BRIEF DESCRIPTION OF THE INVENTION

It has now surprisingly been found that almost quantitative removal of nitrogen oxides from gases can be achieved quite simply if the gas containing the nitrogen oxides is brought into contact with a sulphuric acid solution containing $HNO_3$ so that the chemical consistency of the newly formed gas is altered in such a manner that the nitrogen oxide component is converted into $N_2O_3$.

DETAILED DESCRIPTION OF THE INVENTION

It has been discovered that when nitrogen oxide-containing flue gases are contacted with a sulphuric acid solution containing from 0.1 to 5% by weight of nitric acid, the nitrogen oxide in the flue gas is converted into a stochiometric composition of $NO_2$ and can readily be removed as such from the gas stream.

The present invention thus relates to a process for the removal of nitrogen oxide components from flue gases of combustion plants or reaction gases, in which the nitrogen oxide content present in the stream of the gas is first converted into a stochiometric composition of $N_2O_3$.

The process is preferably carried out in such a manner that the reaction of the nitrogen oxide takes place as a result of contact with a sulphuric acid of medium concentration containing from 0.1 to 5% by weight, preferably from 0.2 to 1.5% by weight of nitric acid.

This sulphuric acid solution used according to the invention contains nitric acid as oxidizing agent. The proportion of nitric acid in this solution may in particular be from 0.1 to 5% by weight but will, of course, depend on the nitrogen oxide content of the exhaust gas. In practice, the proportion of nitric acid would be from 0.20 to 1.5% by weight.

Due to the low proportion of nitric acid, the vapour pressure of nitric acid in the sulphuric acid is also kept very low so that any nitrate present in the gas is negligible.

The sulphuric acid concentrations in the solution used may vary over a wide range, namely from 5 to 96% by weight $H_2SO_4$.

In practice, however, the concentration would vary from 30 to 70% by weight of $H_2SO_4$, preferably from 55 to 65% by weight.

In order to ensure almost complete conversion of the $NO_x$ content, the sulphuric acid concentration should be adjusted so that even nitrogen oxides containing nitrogen in oxidation stage 3 or 4 will not be absorbed.

In a preferred embodiment of the process according to the invention, the sulphuric acid of medium concentration is at a temperature of from 25° C. to 80° C., preferably from 50° C. to 65° C.

The temperatues employed according to the invention ensure that the oxidized exhaust gas will be easily and completely driven out of these solutions so that no trivalent or tetravalent nitrogen oxides are left in the sulphuric acid of medium concentration.

The oxidation of the nitrogen oxide substantially reduces the sulphuric acid concentration due to the water of reaction being dissolved. At the same time, the exhaust gas to be purified may also contain a small quantity of water vapor depending on its temperature, and this will also lower the concentration of sulphuric acid.

In view of these circumstances, it is an important advantage of this temperature control that it enables the sulphuric acid concentration to be adjusted to the required level. An elevated temperature will keep the water balance in the solution constant and hence also the sulphuric acid concentration so that the above mentioned advantages are preserved.

If the concentraion rises to an undesirable extent, the sulphuric acid concentration is adjusted according to the invention by the addition of water and/or dilute nitric acid solution. If the concentration falls too low, a more highly concentrated sulphuric acid is added. A dilute nitric acid solution may also be added as this will both adjust the sulphuric acid concentration and control the nitric acid concentration more accurately.

The combined use of nitric acid and sulphuric acid according to the invention has altogether several advantages. The inclusion of sulphuric acid in the circulating liquid prevents an increase in the concentration of nitric acid during the oxidation of the nitrogen oxides. Moreover, when this procedure is adopted, the total quantity of nitric acid in the sulphuric acid solution may be kept very low so that no overoxidation of NO to $NO_2$ occurs.

In a preferred embodiment of the process according to the invention, the $N_2O_3$ may be converted into nitrogen by a reaction with equivalent quantities of ammonia, optionally in the presence of a suitable catalyst. It may also be advantageous to react the $N_2O_3$ with an alkaline component to convert it into the corresponding nitrite. The alkaline component may be used as a solution or suspension or in the solid state.

The process according to the invention is described below by way of examples which should not, however, be regarded as a limitation.

EXAMPLE 1

An exhaust gas containing NO and having the analytical composition of I is successively brought into contact with a sulphuric acid solution containing nitric acid (0.34% $HNO_3$) and a 15% by weight sodium hydroxide solution. The two solutions are carried through separate absorption towers. The newly formed exhaust gas has the analytical composition II, corresponding to a degree of efficiency of 96.7%.

|  | Exhaust Gas I | Exhaust Gas II |
|---|---|---|
| NO Vol.-% | 0.34 | 0.011 |
| $N_2$ Vol.-% | 92.66 | 93.18 |
| $O_2$ Vol.-% | 3.6 | 3.6 |
| $H_2O$ Vol.-% | 3.40 | 3.20 |

EXAMPLE 2

3421 parts by weight of an exhaust gas containing NO and having the analytical composition III is brought into contact with a sulphuric acid solution IV in countercurrent therewith at a temperature of 60° C.

The oxidized exhaust gas is absorbed in countercurrent in 2338 parts by weight of a 15% by weight sodium hydroxide solution to form a sodium nitrite solution V and a purified exhaust gas. The exhaust gas obtained now contains 190 ppm of NO.

| Exhaust Gas III | Sulphuric Acid Solution IV |
|---|---|
| NO: 11 parts by weight | $H_2SO_4$: 60.9% by weight |
| $N_2$: 3208 parts by weight | $HNO_3$: 0.37% by weight |
| $O_2$: 154 parts by weight | |
| $H_2O$: 48 parts by weight | |
| | Sodium Nitrite Solution V |
| | $NaNO_2$: 12.4 g/l |
| | $NaNO_3$: 0.13% by weight |

What is claimed is:

1. Process for the removal of nitrogen oxide from flue gases of combustion plants or reaction gases comprising stoichiometrically converting the nitrogen oxide contained in the stream of gas into a composition of $N_2O_3$ by contact with a sulfuric acid solution, said sulfuric acid solution having a concentration of $H_2SO_4$ of 30%–70% by weight, and containing from 0.1%–5% by weight nitric acid, at a temperature between 25° C. and 80° C., and removing the $N_2O_3$ from the gas steam.

2. Process acording to claim 1 wherein the sulfuric acid contains 0.2 to 1.5% by weight of nitric acid.

3. Process according to claim 1 wherein the sulfuric acid concentration is from 55 to 65% by weight.

4. Process according to claim 1 wherein the sulfuric acid solution has a temperature of from 50° C. to 65° C.

5. Process according to claim 1 wherein the $N_2O_3$ produced is converted into nitrogen by a reaction with equivalent quantities of ammonia.

6. Process according to claim 1 wherein the $N_2O_3$ produced is converted into a nitrite by reacting $N_2O_3$ with an alkaline reactant.

7. Process according to claim 6 wherein the alkaline reactant is a hydroxide or carbonate of an alkali metal or alkaline earth metal.

8. Process for the removal of nitrogen oxide from flue gases of combustion plants or reaction gases which contain nitrogen oxide, said process comprising:
    (a) contacting said gases with an aqueous, 5 to 96% by weight sulfuric acid solution containing 0.1 to 5% by weight of nitric acid at a temperature of 25° to 80° C. whereby nitrogen oxide is converted to a stoichiometric composition of $N_2O_3$ and
    (b) contacting the gases treated in step (a) with an alkali metal hydroxide to produce gases substantially free from nitrogen oxide.

9. Process according to claim 8 wherein the contact in steps (a) and (b) is a countercurrent contact.

10. Process according to claim 8 wherein the sulfuric acid solution of step (a) is an aqueous solution containing 30 to 70% by weight sulfuric acid and 0.2 to 1.5% by weight nitric acid.

11. Process according to claim 8 wherein the alkali metal hydroxide of step (b) is an aqueous soltuion of sodium hydroxide.

* * * * *